US008984100B2

(12) United States Patent
Fu et al.

(10) Patent No.: US 8,984,100 B2
(45) Date of Patent: Mar. 17, 2015

(54) DATA DOWNLOADING METHOD, TERMINAL, SERVER, AND SYSTEM

(71) Applicant: Tencent Technology (Shenzhen) Company Limited, Shenzhen (CN)

(72) Inventors: Guowei Fu, Shenzhen (CN); Gang Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/232,074

(22) PCT Filed: Jan. 29, 2013

(86) PCT No.: PCT/CN2013/071065
§ 371 (c)(1),
(2) Date: Jan. 10, 2014

(87) PCT Pub. No.: WO2013/120412
PCT Pub. Date: Aug. 22, 2013

(65) Prior Publication Data
US 2014/0156809 A1 Jun. 5, 2014

(30) Foreign Application Priority Data

Feb. 17, 2012 (CN) .......................... 2012 1 0036828
Jun. 1, 2012 (CN) .......................... 2012 1 0179122

(51) Int. Cl.
*G06F 15/16* (2006.01)
*H04L 29/08* (2006.01)
(52) U.S. Cl.
CPC .............. *H04L 67/06* (2013.01); *H04L 67/104* (2013.01)
USPC ........................................ 709/219; 709/228
(58) Field of Classification Search
USPC ................................................ 709/219, 228
See application file for complete search history.

(56) References Cited

U.S. PATENT DOCUMENTS

2009/0271502 A1* 10/2009 Xue et al. ...................... 709/219
2011/0131336 A1* 6/2011 Wang et al. ................... 709/228

FOREIGN PATENT DOCUMENTS

| CN | 101247402 | 8/2008 |
| CN | 101409706 | 4/2009 |
| CN | 101741883 | 6/2010 |
| CN | 102082807 | 6/2011 |

OTHER PUBLICATIONS

International Search Report issued May 16, 2013, in PCT/CN13/071065 filed Jan. 29, 2013.

* cited by examiner

*Primary Examiner* — Tammy Nguyen
(74) *Attorney, Agent, or Firm* — Oblon, McClelland, Maier & Neustadt, L.L.P.

(57) ABSTRACT

A data downloading method, wherein the method includes the following steps: obtaining a downloading request for a file to be downloaded, wherein the downloading request includes an original downloading link, which is any one of a source URL link, a BT seed file, and an eMule downloading link; obtaining a hash value of the file to be downloaded based on the original downloading link; based on the hash value of the file to be downloaded, if the original downloading link is the BT seed file, obtaining the eMule downloading link information of the file to be downloaded and a multi-source URL set; if the original downloading link is the eMule downloading link, obtaining the Bt seed file information of the file to be downloaded and the multi-source URL set; and if the original downloading link is the source URL link, obtaining the Bt seed file information and the eMule downloading link information of the file to be downloaded and the multi-source URL set; downloading the file to be downloaded based on the obtained Bt seed file information and/or eMule downloading link information of the file to be downloaded, and the multi-source URL set. In the above method, the data sharing based on the networks over different downloading protocols may be implemented.

16 Claims, 8 Drawing Sheets

DATA DOWNLOADING METHOD, TERMINAL, SERVER, AND SYSTEM

The present application claims priority from Chinese Patent Application No. 201210036828.3 entitled "A METHOD, TERMINAL, SERVER AND SYSTEM FOR DOWNLOADING RESOURCES" filed on Feb. 17, 2012 and Chinese Patent Application No. 201210179122.2 entitled "DATA DOWNLOADING METHOD AND SYSTEM" filed on Jun. 1, 2012, the entire contents of which being incorporated herein by reference.

FIELD OF THE INVENTION

The present invention relates to network technology, and more particular to a data downloading method, terminal, server and system.

BACKGROUND

Major modes for downloading data include P2P (Peer to Peer) and P2SP (Peer to Server & Peer). P2P is a kind of data transmission by an arbitration-mediation server based on a peer to peer protocol, and P2SP is abbreviation of "peer to server & peer", wherein the "peer" indicates a network node or terminal. A P2SP downloading system may effectively integspeed various resources scattered in the Internet, may provide more channels for downloading data for a user, and may implement data sharing, and the stability thereof is considerably improved compared with the traditional P2P downloading system. Currently, three most widely used downloading protocols are Http (Hypertext transport protocol) downloading protocol, Bt (BitTorrent) downloading protocol and eMule downloading protocol.

However, a general P2SP downloading system may adopt one of the above three downloading protocols, and each downloading system can only share data in the same downloading protocol. For example, a user adopts a Bt downloading protocol based downloading system; and when the user is downloading a data file, the downloading system will firstly obtain the seed file of the data file, and then look up the peer (Peer) that stores the data file in the Internet based on the seed file, so as to form a P2P network and implement sharing of the data file in the P2P network. Another user adopts an eMule downloading protocol based downloading system; and when the user is downloading the same data, the downloading system will firstly obtain an information abstract value of the data, and then look up the peer that stores the data file in the Internet based on the information abstract value, so as to form a new P2P network. This user may merely share the data with other peers in this new P2P network, and may not share the data in the Bt downloading protocol based P2P network.

Thus, a seamless sharing of the data resources in the network is not sufficiently implemented by the conventional P2SP technology. The P2P networks based on different downloading protocols are isolated from each other, and the same data file to be downloaded cannot be shared by the peers in the P2P networks, and the communication between the P2P networks based on different downloading protocols has not implemented yet.

SUMMARY OF THE INVENTION

Therefore, it is necessary to provide a data downloading method, terminal, server and system which is capable of implementing data sharing based on the networks over different downloading protocols. The technical solutions are as follows.

A data downloading method is provided, wherein the method includes the following steps:

obtaining a downloading request for a file to be downloaded, wherein the downloading request includes an original downloading link, which is any one of a source URL link, a BT seed file, and an eMule downloading link;

obtaining a hash value of the file to be downloaded based on the original downloading link;

based on the hash value of the file to be downloaded, if the original downloading link is the BT seed file, obtaining the eMule downloading link information of the file to be downloaded and a multi-source URL set; if the original downloading link is the eMule downloading link, obtaining the Bt seed file information of the file to be downloaded and the multi-source URL set; and if the original downloading link is the source URL link, obtaining the Bt seed file information and the eMule downloading link information of the file to be downloaded and the multi-source URL set;

downloading the file to be downloaded based on the obtained Bt seed file information and/or eMule downloading link information of the file to be downloaded, and the multi-source URL set.

A data downloading system including a downloading server and a downloading client is provided, wherein the downloading server includes:

a resource inquiring server, being configured for obtaining a downloading request for a file to be downloaded, the downloading request includes an original downloading link, and the original downloading link is anyone of a source URL link, a BT seed file, and a eMule downloading link;

a logic server group, being configured for obtaining a hash value of the file to be downloaded based on the original downloading link;

the logic server group is further configured for: based on the hash value of the file to be downloaded, if the original downloading link is the BT seed file, obtaining the eMule downloading link information of the file to be downloaded and a multi-source URL set; if the original downloading link is the eMule downloading link, obtaining the Bt seed file information of the file to be downloaded and the multi-source URL set; and if the original downloading link is the source URL link, obtaining the Bt seed file information and the eMule downloading link information of the file to be downloaded and the multi-source URL set;

the downloading client is configured for downloading the file to be downloaded based on the obtained Bt seed file information and/or eMule downloading link information of the file to be downloaded, and the multi-source URL set.

A data downloading method is provided, wherein the method includes the following steps:

transmitting a downloading request message to a resource mapping server when downloading a file to be downloaded, wherein the downloading request message carries a downloading link of the file to be downloaded in a first resource network;

receiving a downloading response message transmitted by the resource mapping server, wherein the downloading response message carries the downloading links of the file to be downloaded respectively in the first resource network and a second resource network, and the second resource network is one or more kinds of resource networks which are different from the first resource network;

downloading the file to be downloaded based on the downloading links of the file to be downloaded respectively in the first and the second resource networks.

A data downloading method is provided, wherein the method includes the following steps:

receiving a downloading request message transmitted by a terminal, wherein the downloading request message carries a downloading link of the file to be downloaded in a first resource network;

obtaining the downloading links of the file to be downloaded respectively in a first and a second resource networks based on the downloading link of the file to be downloaded in the first resource network, wherein the second resource network is one or more kinds of resource networks which are different from the first resource network;

transmitting a downloading response message to the terminal, wherein the downloading response message carries the downloading links of the file to be downloaded respectively in the first and the second resource networks, so that the terminal downloads the file to be downloaded based on the downloading links of the file to be downloaded respectively in the first and the second resource networks.

A terminal is provided, wherein the terminal includes:

a first transmitting module, being configured for transmitting a downloading request message to a resource mapping server when downloading a file to be downloaded, wherein the downloading request message carries a downloading link of the file to be downloaded in a first resource network;

a first receiving module, being configured for receiving a downloading response message transmitted by the resource mapping server, wherein the downloading response message carries the downloading links of the file to be downloaded respectively in the first resource network and a second resource network, and the second resource network is one or more kinds of resource networks which are different from the first resource network;

a downloading module, being configured for downloading the file to be downloaded based on the downloading links of the file to be downloaded respectively in the first and the second resource networks.

A resource mapping server is provided, wherein the server includes:

a second receiving module, being configured for receiving a downloading request message transmitted by a terminal, wherein the downloading request message carries a downloading link of the file to be downloaded in a first resource network;

a second acquiring module, being configured for obtaining the downloading links of the file to be downloaded respectively in the first resource network and a second resource network based on the downloading link of the file to be downloaded in the first resource network, wherein the second resource network is one or more kinds of resource networks which are different from the first resource network;

a second transmitting module, being configured for transmitting a downloading response message to the terminal, wherein the downloading response message carries the downloading links of the file to be downloaded respectively in the first and the second resource networks, so that the terminal downloads the file to be downloaded based on the downloading links of the file to be downloaded respectively in the first and the second resource networks.

A resource downloading system is provided, wherein the system includes the above terminal and the above resource mapping server.

In the embodiments of the present invention, the downloading request containing the original downloading link of the file to be downloaded is obtained, and the hash value of the file to be downloaded is obtained based on the original downloading link. Then based on the hash value of the file to be downloaded, the Bt seed file information and the eMule downloading link information of the file to be downloaded are obtained or one of the Bt seed file information and the eMule downloading link information of the file to be downloaded which is different from the original downloading link is obtained, and the multi-source URL set of the file to be downloaded is obtained. Finally, the file to be downloaded is downloaded based on the multi-source URL set, the Bt seed file information and the eMule downloading link information of the file to be downloaded. According to the above method and system, the multi-source URL set, the Bt seed file information and the eMule downloading link information of the file to be downloaded may be obtained after the original downloading link of the file to be downloaded is obtained, so that the file to be downloaded may be downloaded simultaneously in the respective P2P networks by the downloading modes which are based on the three downloading protocols. As a result, the above method and system may sufficiently utilize the network resources and implement the data sharing based on the networks over different downloading protocols.

DETAILED DESCRIPTION

In the following, several embodiments of the present invention will be further described in details by referring to the figures to further clarify the objects, the technical solutions and the advantages of the present invention.

Figure 1:
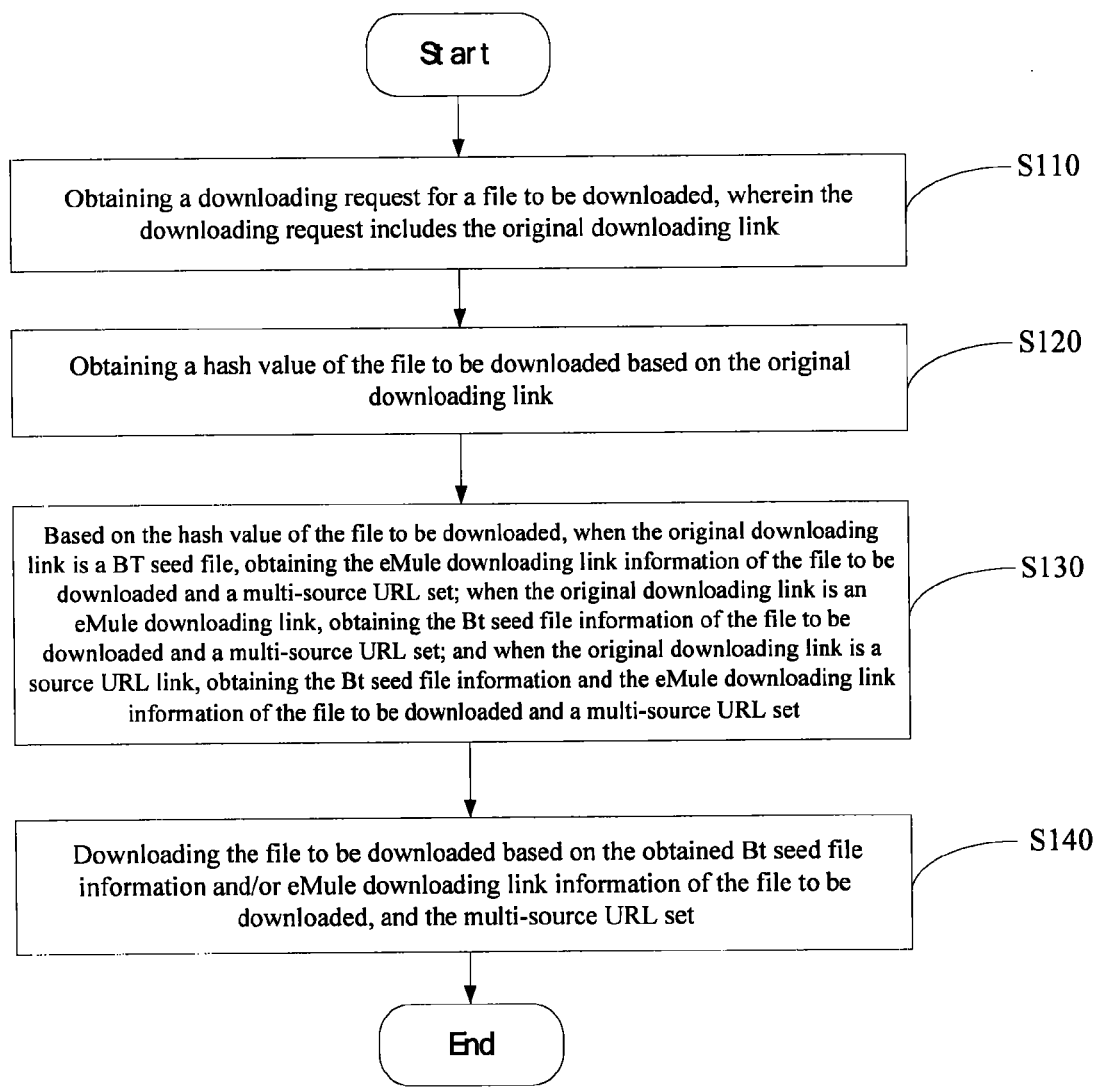
FIG. 1 is a flow diagram for a data downloading method in an embodiment.

As illustrated in FIG. 1, in one embodiment, a data downloading method includes the following steps.

Step 101: obtaining a downloading request for a file to be downloaded, wherein the downloading request includes an original downloading link, which is any one of a source URL link, a BT seed file, and an eMule downloading link.

The downloading request includes the original downloading link of the file to be downloaded. After the downloading request is obtained, the original downloading link of the file to be downloaded may be extracted from the downloading request. Generally, the original downloading link is the source URL link or the Bt seed or the eMule downloading link.

Step 120: obtaining a hash value of the file to be downloaded based on the original downloading link.

After the original downloading link of the file to be downloaded is obtained, it is necessary to acquire a unique identifier of the file to be downloaded based on the original downloading link, and such unique identifier of the file to be downloaded may be the hash value of the file to be downloaded.

Step 130: when the original downloading link is a BT seed file, obtaining the eMule downloading link information of the file to be downloaded and a multi-source URL set based on the hash value of the file to be downloaded; when the original downloading link is an eMule downloading link, obtaining the Bt seed file information of the file to be downloaded and a multi-source URL set based on the hash value of the file to be downloaded; and when the original downloading link is a source URL link, obtaining the Bt seed file information and the eMule downloading link information of the file to be downloaded and a multi-source URL set based on the hash value of the file to be downloaded.

The hash value is the unique identifier for the file, and thus the hash value of the same file is identical regardless of the category of the downloading protocol. As a result, after the hash value of the file to be downloaded is obtained, the downloading links of the file to be downloaded in different downloading protocols may be obtained by a preset mapping relationship.

In one embodiment, the original downloading link is a source URL link, and the above step 120 may be described as follows: inquiring the hash value corresponding to the source URL link of the file to be downloaded based on a preset mapping relationship between the URL link and the hash value.

Specifically, when the original downloading link of the file to be downloaded is the source URL link, the preset mapping relationship between the URL link and the hash value is inquired; and in this mapping relationship, each URL link corresponds to a hash value. The URL identical with the source URL link is found in the mapping relationship, and the corresponding hash value thereof is the hash value of the file to be downloaded.

In this embodiment, the above step S130 may be described as follows: inquiring the multi-source URL set corresponding to the hash value of the file to be downloaded based on the preset mapping relationship between the URL link and the hash value; inquiring the Bt seed file information corresponding to the hash value of the file to be downloaded based on the preset mapping relationship between the Bt seed file information and the hash value; and inquiring the eMule downloading link information corresponding to the hash value of the file to be downloaded based on the preset mapping relationship between the eMule downloading link information and the hash value.

Specifically, there may be a plurality of download addresses for the same file. In the mapping relationship between the URL link and the hash value, each hash value might correspond to a plurality of URL links. When the preset mapping relationship between the URL link and the hash value is inquired, it is possible to obtain the plurality of URL downloading links of the file to be downloaded, which together constitute the multi-source URL set.

Specifically, the BT seed file information includes a feature code and a file number of the BT seed file. The corresponding relationship of a group of data constituted by the file hash value and the feature code and the file number of the Bt seed is recorded in the mapping relationship between the Bt seed file information and the hash value. The same file might correspond to a plurality of Bt seeds, and thus each hash value might correspond to a group of feature codes and file numbers of a plurality of Bt seeds in the mapping relationship between the BT seed file information and the hash value. In obtaining of the Bt seed file information of the file to be downloaded, generally the feature code and file number of the Bt seed with the fastest average downloading speed are obtained.

In one embodiment, downloading related information such as the downloading duration, average downloading speed, etc will be reported upon completion of downloading of each file. Based on the reported information, the average downloading speed of each Bt seed file being stored is calculated, so as to facilitate selection of the Bt seed with the fastest average downloading speed.

Specifically, the eMule downloading link information is an information abstract value and a file size of the file to be downloaded. Since the information abstract value is also a unique identifier of the file to be downloaded, the hash value of the file to be downloaded and the information abstract value of the file are in a relationship of one-to-one correspondence. The mapping of the hash value of the file to be downloaded and the information abstract value and file size of the file to be downloaded is recorded in a preset mapping relationship between the eMule downloading link information and the hash value. Thus, the information abstract value and the file size which are unique to the file to be downloaded may be obtained by inquiring the hash value.

In another embodiment, the original downloading link is a BT seed file, and the above step S120 may be described as follows: inquiring the hash value corresponding to the BT seed file information of the file to be downloaded based on a preset mapping relationship between the Bt seed file information and the hash value.

Specifically, when the original downloading link of the file to be downloaded is the Bt seed, the preset mapping relationship between the BT seed file information and the hash value is inquired. In this embodiment, the BT seed file information is a group of data constituted by the feature code and file number of the Bt seed file of the file to be downloaded. In this mapping relationship, the feature code and the file number of the Bt seed file both correspond to the hash value, wherein the same hash value may correspond to the feature codes and file numbers of a plurality of files with the same Bt seed. Thus, in the inquiry, the feature code and file number of the Bt seed of the file to be downloaded may be adopted as the primary key of the inquiry to obtain the hash value of the file to be downloaded.

In this embodiment, the above step S130 may be described as follows: inquiring the multi-source URL set corresponding to the hash value of the file to be downloaded based on the preset mapping relationship between the URL link and the hash value; and inquiring the eMule downloading link information corresponding to the hash value of the file to be downloaded based on the preset mapping relationship between the eMule downloading link information and the hash value.

In another embodiment, the original downloading link is an eMule downloading link, and the above step S120 may be described as follows: inquiring the hash value corresponding to the eMule downloading link information of the file to be downloaded based on a preset mapping relationship between the eMule downloading link information and the hash value.

Specifically, when the original downloading link of the file to be downloaded is the eMule downloading link, the preset mapping relationship between the eMule downloading link information and the hash value is inquired. In this embodiment, the eMule downloading link information is an information abstract value and a file size of the file to be downloaded. In this mapping relationship, the information abstract value and the file size of the file to be downloaded both correspond to the hash value, wherein the hash value is in a one-to-one correspondence with the information abstract value and the file size of the file to be downloaded. Thus, in the inquiry, firstly the information abstract value of the file is extracted from the eMule downloading link, and then the information abstract value of the file to be downloaded may be adopted as the primary key of the inquiry to obtain the hash value of the file to be downloaded.

In this embodiment, the above step S130 may be described as follows: inquiring the multi-source URL set corresponding to the hash value of the file to be downloaded based on the preset mapping relationship between the URL link and the hash value; and inquiring the Bt seed file information corresponding to the hash value of the file to be downloaded based on the preset mapping relationship between the Bt seed file information and the hash value.

Step S140: downloading the file to be downloaded based on the obtained Bt seed file information and/or eMule downloading link information of the file to be downloaded, and the multi-source URL set.

After the multi-source URL set, the Bt seed file information and the eMule downloading link information of the file to be downloaded are obtained, the file to be downloaded may be downloaded by three downloading modes, i.e. the Http downloading, the Bt downloading and the eMule downloading.

Figure 2:
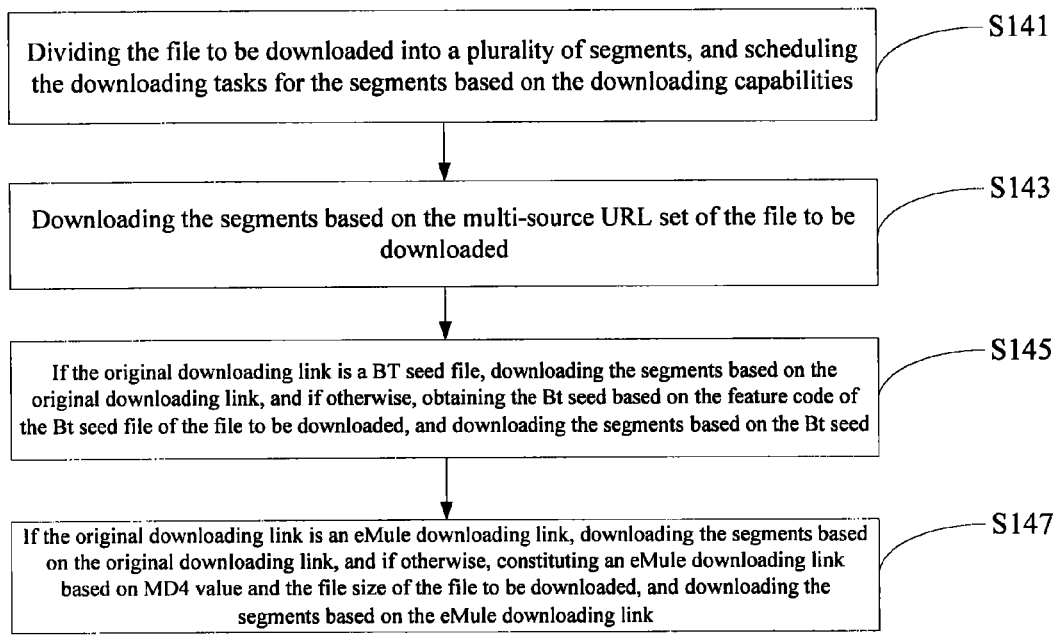
FIG. 2 is a flow diagram for downloading the file to be download based on the Bt seed file information and/or the eMule downloading link information of the obtained file to be downloaded and the multi-source URL (Universal Resource Locator) set in an embodiment.

As illustrated in FIG. 2, in one embodiment, the Bt seed file information is the feature code and the file number of the Bt seed file, and the eMule downloading link information is the information abstract value and the file size of the file to be downloaded; and the above step S140 may be described specifically as follows:

Step 141: dividing the file to be downloaded into a plurality of segments, and scheduling the downloading tasks for the segments based on the downloading capabilities.

Specifically, since there are differences among various resources based on the different downloading modes having different protocols, the downloading capabilities of the three downloading modes are also different. For example, the number of resources for a file A under the Bt downloading protocol is comparatively large, and thus the BT downloading capability is the strongest for the file A; and the number of resources for a file B under the eMule protocol is comparatively large, and thus the eMule downloading capability is the strongest for the file B. Therefore, it is necessary to divide the file to be downloaded into a plurality of segments before downloading, and assign the downloading tasks for the segments under the different downloading modes according to the downloading capabilities.

Step S143: downloading these segments based on the multi-source URL set of the file to be downloaded.

Specifically, when the downloading under Http protocol is performed, the peer of the URL link in the multi-source URL set is found by a Tracker server based on the multi-source URL set of the file to be downloaded, and a Http downloading protocol based P2P network is constituted, and then the P2P downloading is implemented based on the P2P network and the downloading task being assigned is completed.

Step S145: if the original downloading link is a Bt seed file, downloading the segments based on the original downloading link; otherwise, obtaining the Bt seed based on the feature code of the Bt seed file of the file to be downloaded, and downloading the segments based on the Bt seed.

Specifically, when the downloading under Bt protocol is performed, if the original downloading link is a Bt seed file, it is unnecessary to obtain the Bt seed file based on the Bt seed file information, and the Bt downloading may be directly implemented by the original downloading link. If the original downloading link is not a Bt seed file, firstly a Bt seed will be obtained based on the feature code of the Bt seed file of the file to be downloaded. The Bt seed is stored in the Bt seed storage, and each Bt seed corresponds to a unique feature code of the Bt seed; when the feature code of the Bt seed file is obtained, the Bt seed may be found in the Bt seed storage by the feature code. Then the peers containing the Bt seed may be found by the Tracker server based on the Bt seed, and a Bt downloading protocol based P2P network is constituted, and then the P2P downloading is implemented based on the P2P network so as to complete the downloading task being assigned.

Step S147: if the original downloading link is an eMule downloading link, downloading the segments based on the original downloading link; otherwise, constituting the eMule downloading link based on the information abstract value and the file size of the file to be downloaded, and downloading the segments based on the eMule downloading link.

Specifically, when the downloading under eMule protocol is performed, if the original downloading link is an eMule downloading link, it is unnecessary to obtain the eMule downloading link based on the eMule downloading link information, and the eMule downloading may be directly implemented by the original downloading link. If the original downloading link is not an eMule downloading link, firstly the eMule downloading link is constituted based on the information abstract value and the file size of the file to be downloaded. Then the peers containing the eMule downloading link may be found by the Tracker server based on the eMule downloading link, an eMule downloading protocol based P2P network is constituted, and then the P2P downloading is implemented based on the P2P network, so as to complete the downloading task being assigned.

In one embodiment, if the downloading tasks assigned to one or two of the downloading modes are completed ahead of schedule, the remaining downloading tasks will be reassigned for saving the network resources and reducing the time consuming of downloading.

In another embodiment, the data downloading method further includes:

when the file to be downloaded is a new file, establishing and storing a mapping relationship between the URL link and the hash value of the new file, between the Bt seed information and the hash value, or between the eMule downloading link information and the hash value.

Specifically, after the original downloading link is obtained, it is determined that the file to be downloaded is a new file if the hash value of the file to be downloaded cannot be found based on the original downloading link. The hash value of the new file is firstly calculated, and if the original downloading link of the new file is a source URL link, a bidirectional mapping relationship between the URL link and the hash value is established and stored; and if the original downloading link of the new file is an eMule downloading link, a bidirectional mapping relationship between the eMule downloading link information and the hash value is established and stored; and if the original downloading link of the new file is a Bt seed file, a bidirectional mapping relationship between the Bt seed file information and the hash value is established and stored.

Furthermore, when the original downloading link of the new file is the BT seed file, the data downloading method further includes:

obtaining and storing a Bt seed file of the file to be downloaded.

Specifically, the Bt seed file of the new file is stored in the Bt seed storage. In the subsequent downloading process, after the feature code of the Bt seed file is obtained, the corresponding Bt seed file can be found in the Bt seed storage. Thus, the downloading may be performed based on the Bt seed file.

A protocol variation of the Bt downloading protocol is so-called Magnet protocol, i.e. "Magnet link". The main function of the Magnetic link lies in recognizing the Bt seed file. The link is a "digital fingerprint" in plain text generated by the hash result of different file contents, so as to recognize the Bt seed file of the file. However, the difference lies in that this "digital fingerprint" may be generated from any file by anyone, so that the "magnet link" does not need to be supported by any "central mechanism" (for example, Bt Tracker server), and the recognition accuracy is very high. When the variation of the Bt downloading protocol, i.e. the Magnet protocol is adopted for downloading, the Bt seed file stored in the Bt seed storage may be directly recognized by the "digital fingerprint" in the Magnet protocol, and then the downloading is implemented based on the Bt seed file, so that the downloading efficiency under the Magnet protocol may be improved.

Figure 3:
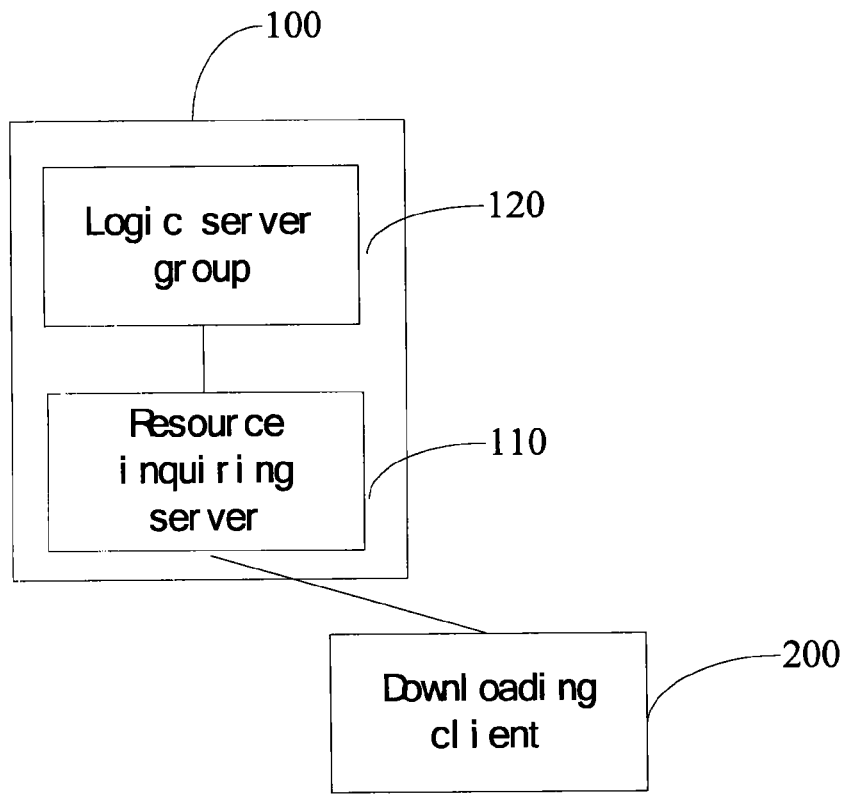
FIG. 3 is a block diagram for a data downloading system in an embodiment.

As illustrated in FIG. 3, the present invention also provides a data downloading system. The data downloading system includes a downloading server 100 and a downloading client 200. The downloading server 100 includes a resource inquiring server 110 and a logic server group 120.

The resource inquiring server 110 is configured for obtaining a downloading request for a file to be downloaded, wherein the downloading request includes an original downloading link, and the original downloading link is anyone of a source URL link, a BT seed file, and an eMule downloading link.

The downloading request includes the original downloading link of the file to be downloaded. After the downloading request is obtained, the resource inquiring server 110 may extract the original downloading link of the file to be downloaded from the downloading request. Generally, the original downloading link is the source URL link or the Bt seed or the eMule downloading link.

The logic server group 120 is configured for obtaining a hash value of the file to be downloaded based on the original downloading link.

After the resource inquiring server 110 has obtained the original downloading link of the file to be downloaded, it is necessary for the logic server group 120 to acquire a unique identifier of the file to be downloaded based on the original downloading link: the hash value of the file to be downloaded.

Figure 4:
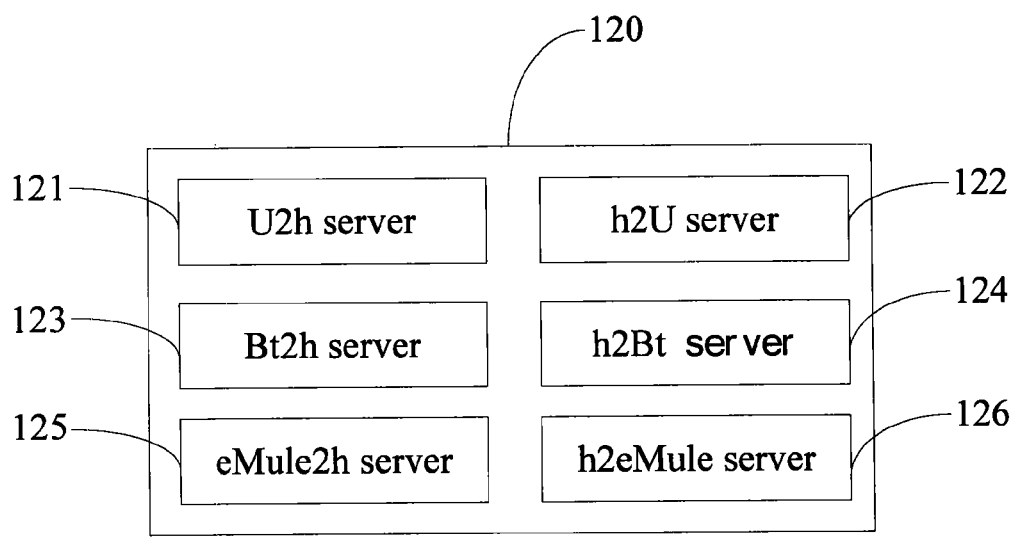
FIG. 4 is a block diagram for a logic server group in an embodiment.

As illustrated in FIG. 4, in one embodiment, the logic server group 120 includes a U2h server 121, a Bt2h server 123 and an eMule2h server 125.

The U2h server 121 is configured for, when the original downloading link is a source URL link, inquiring the hash value corresponding to the source URL link of the file to be downloaded based on a preset mapping relationship between the URL link and the hash value.

The U2h server 121 is a mapping server between the URL link and the hash value of the corresponding file; specifically, when the original downloading link of the file to be downloaded is the source URL link, the U2h server 121 inquires the preset mapping relationship between the URL link and the hash value, and in this mapping relationship, each URL link corresponds to a hash value. The U2h server 121 finds the URL link identical with the source URL link in the mapping relationship, and the corresponding hash value thereof is the hash value of the file to be downloaded.

The Bt2h server 123 is configured for, when the original downloading link is a BT seed file, inquiring the hash value corresponding to the Bt seed file information of the file to be downloaded based on a preset mapping relationship between the Bt seed file information and the hash value.

The Bt2h server 123 is a mapping server between the Bt seed file and the hash value of the corresponding file. Specifically, when the original downloading link of the file to be downloaded is a Bt seed, the Bt2h server 123 inquires the preset mapping relationship between the Bt seed file information and the hash value. In this embodiment, the Bt seed file information is a feature code and a file number of the Bt seed file of the file to be downloaded, and in this mapping relationship, the feature code and the hash value of the Bt seed file correspond to each other. Thus, when the Bt2h server 123 performs the inquiry, the feature code and the file number of the Bt seed of the file to be downloaded may be adopted as the primary key of the inquiry to obtain the hash value of the file to be downloaded.

The eMule2h server 125 is configured for, when the original downloading link is an eMule downloading link, inquiring the hash value corresponding to the eMule downloading link information of the file to be downloaded based on a preset mapping relationship between the eMule downloading link information and the hash value.

The eMule2h server 125 is a mapping server between the eMule downloading link and the hash value of the file. Specifically, when the original link of the file to be downloaded is an eMule downloading link, the eMule2h server 125 inquires the preset mapping relationship between the eMule downloading link information and the hash value. In this embodiment, the eMule downloading link information is an information abstract value and a file size of the file to be downloaded, and in this mapping relationship, the information abstract value and the hash value of the file to be downloaded correspond to each other. Thus, when the eMule2h server 125 performs the inquiry, firstly the information abstract value of the file is extracted from the eMule downloading link, and then the information abstract value of the file to be downloaded may be adopted as the primary key of the inquiry to obtain the hash value of the file to be downloaded.

Furthermore, the logical server group 120 is further configured for, based on the hash value of the file to be downloaded, obtaining the eMule downloading link information of the file to be downloaded and a multi-source URL set when the original downloading link is a Bt seed file; obtaining the Bt seed file information of the file to be downloaded and a multi-source URL set when the original downloading link is the eMule downloading link; and obtaining the Bt seed file information and the eMule downloading link information of the file to be downloaded and a multi-source URL set when the original downloading link is a source URL link.

The hash value is a unique identifier for the file, and thus the hash value of the same file is identical regardless of the category of the downloading protocol. As a result, after obtaining the hash value of the file to be downloaded, the logic server group 120 may obtain the downloading links of the file to be downloaded under different downloading protocols by a preset mapping relationship.

In one embodiment, the logic server group 120 further includes a h2U server 122, a h2Bt server 124 and a h2eMule server 126.

The h2U server 122 is configured for inquiring the multi-source URL set corresponding to the hash value of the file to be downloaded based on the preset mapping relationship between the URL link and the hash value.

The h2U server 122 is a mapping server between the file hash and the corresponding URL link. The same file may have a plurality of downloading links. In the mapping relationship between the URL link and the hash value, each hash value may correspond to a plurality of downloading links. When the h2U server 122 inquires the preset mapping relationship between the URL link and the hash value, a plurality of URL downloading links of the file to be downloaded may be obtained, and the plurality of URL downloading links of the file to be downloaded commonly constitute the multi-source URL set.

The h2Bt server 124 is configured for inquiring the Bt seed file information corresponding to the hash value of the file to be downloaded based on the preset mapping relationship between the Bt seed file information and the hash value.

The h2Bt server 124 is a mapping server between the file hash and the corresponding Bt seed file. In one embodiment, the Bt seed file information includes the feature code and the file number of the Bt seed file, and the corresponding relationship of a group of data constituted by the file hash value and the feature code of the Bt seed and the file number of the Bt seed is recorded in the mapping relationship between the Bt seed file information and the hash value. The same file might correspond to a plurality of Bt seeds, and thus each hash value might correspond to a group of feature codes and file numbers of a plurality of same Bt seeds in the mapping relationship between the Bt seed file information and the hash value. When obtaining the Bt seed file information of the downloading file, the h2Bt server 124 generally obtains the feature code and the file number of the Bt seed with the fastest average downloading speed. In one embodiment, the data downloading system further includes a statistics server. The downloading client reports such downloading related information as the downloading duration, average downloading speed and etc to the statistics server each time the downloading is completed. The statistics server calculates and analyzes the downloading related information to obtain the quality of various resources and the average speed of each Bt seed file, so as to facilitate selection of the Bt seed file with the fastest average downloading speed.

The h2eMule server 126 is configured for inquiring the eMule downloading link information corresponding to the hash value of the file to be downloaded based on the preset mapping relationship between the eMule downloading link information and the hash value.

The h2eMule server 126 is a mapping server between the file hash and the corresponding eMule downloading link. In one embodiment, the eMule downloading link information is the information abstract value and the file size of the file to be downloaded. Since the information abstract value is also a unique identifier of the file to be downloaded, the hash value of the file to be downloaded and the information abstract value of the file are in a relationship of one-to-one correspondence. The mapping of the hash value of the file to be downloaded and the information abstract value and the file size of the file to be downloaded is recorded in the preset mapping relationship between the eMule downloading link information and the hash value. Thus, the h2eMule server 126 may obtain the information abstract value and the file size which is unique to the file to be downloaded by inquiring the hash value.

In another embodiment, when the original downloading link is a Bt seed file, the logic server group 120 may merely include the h2U server 122 and the h2eMule server 126.

In another embodiment, when the original downloading link is an eMule downloading link, the logic server group 120 may merely include the h2U server 122 and the h2Bt server 124.

The downloading client 200 is configured for downloading the file to be downloaded based on the obtained Bt seed file information and/or the eMule downloading link information of the file to be downloaded as well as the multi-source URL set.

After the logic server group 120 obtains the multi-source URL set, the Bt seed file information and the eMule downloading link information of the file to be downloaded, the client server 200 may download the file to be downloaded by any one of three downloading modes, i.e. the Http downloading, the Bt downloading and the eMule downloading.

Figure 5:
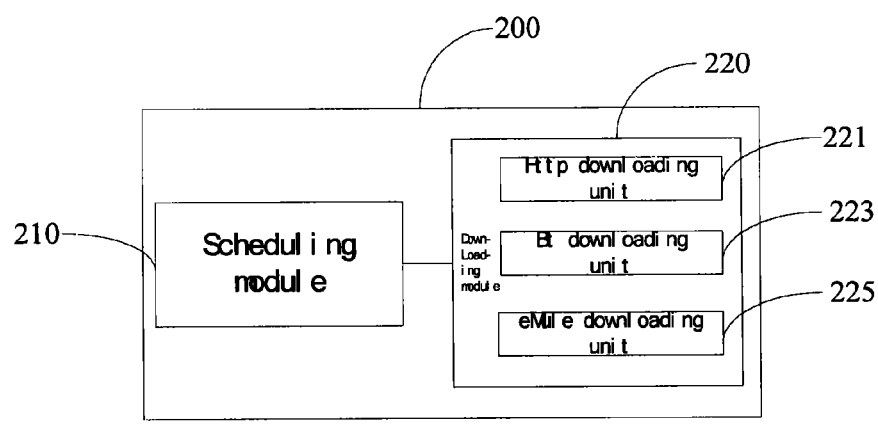
FIG. 5 is a block diagram for a download client in an embodiment.

As illustrated in FIG. 5, in one embodiment, the Bt seed file information is a feature code and a file number of the BT seed file. The downloading client 200 includes a scheduling module 210 and a downloading module 220. And the downloading module 220 includes a Http downloading unit 221, a Bt downloading unit 223 and an eMule downloading unit 225.

The scheduling module 210 is configured for dividing the file to be downloaded into a plurality of segments, and scheduling the downloading tasks for the segments based on the downloading capabilities.

Specifically, since there are differences among various resources based on the downloading modes by different protocols, the downloading capabilities of the three downloading modes are different when different files are downloaded. For example, the number of resources for a file A under the Bt downloading protocol is comparatively large, and thus the Bt downloading capability is the strongest for the file A; and the number of resources for a file B under the eMule protocol is comparatively large, and thus the eMule downloading capability is the strongest for the file B. Therefore, it is necessary for the scheduling module to firstly divide the file to be downloaded into a plurality of segments before downloading, and the downloading tasks for the segments are assigned for the different downloading units of the downloading module 220 according to the downloading capabilities.

The Http downloading unit 221 is configured for downloading the segments based on the multi-source URL set of the file to be downloaded.

Specifically, when the downloading under Http protocol is performed by the Http downloading unit 221, the peers of the URL link in the multi-source URL set are found by the Tracker server based on the multi-source URL set of the file to be downloaded, and a Http downloading protocol based P2P network is constituted, and then the P2P downloading is implemented based on the P2P network so as to complete the downloading task being assigned.

The Bt downloading unit 223 is configured for, if the original downloading link is a Bt seed file, downloading the segments based on the original downloading link, and if otherwise, obtaining the Bt seed based on the feature code of the Bt seed file of the file to be downloaded, and downloading the segments based on the Bt seed.

Specifically, when the downloading under Bt protocol is performed by the Bt downloading unit 223, if the original downloading link is a Bt seed file, it is unnecessary for Bt downloading unit 223 to obtain the Bt seed file based on the Bt seed file information, and the Bt downloading may be directly implemented by the original downloading link. If the original downloading link is not a Bt seed file, then the Bt downloading unit 223 firstly obtains the Bt seed based on the feature code of the Bt seed file of the file to be downloaded. The Bt seed is stored in the Bt seed storage, and each Bt seed corresponds to a unique feature code of the Bt seed, and after obtaining the feature code of the Bt seed file, the Bt downloading unit 223 may find the Bt seed in the Bt seed storage by the feature code, then find the peers containing the Bt seed by the Tracker server based on the Bt seed, constitute a Bt downloading protocol based P2P network, and then implement the P2P downloading based on the P2P network, so as to complete the downloading task being assigned.

The eMule downloading unit 225 is configured for, if the original downloading link is an eMule downloading link, downloading the segments based on the original downloading link, and if otherwise, constituting an eMule downloading link based on the information abstract value and the file size of the file to be downloaded, and downloading the segments based on the eMule downloading link.

Specifically, when the downloading under eMule protocol is performed by the eMule downloading unit 225, if the original downloading link is an eMule downloading link, it is unnecessary for the eMule downloading unit 225 to obtain the eMule downloading link based on the eMule downloading link information, and the eMule downloading may be directly implemented by the original downloading link. If the original downloading link is not an eMule downloading link, the eMule downloading unit 225 firstly constitutes the eMule downloading link based on the information abstract value and the file size of the file to be downloaded, then finds the peers containing the eMule downloading link by the Tracker server based on the eMule downloading link, constitutes an eMule downloading protocol based P2P network, and then implements the P2P downloading based on the P2P network, so as to complete the downloading task being assigned.

In one embodiment, if one or two of the downloading units complete the downloading tasks being assigned ahead of schedule during the downloading procedure of the file to be downloaded, the scheduling module 210 may reassign the remaining downloading tasks for saving the network resources and reducing the time consuming of downloading. The scheduling module 210 keeps the three downloading units in operation, and prevents the downloading units from being idle, so as to improve the downloading efficiency.

Figure 6:
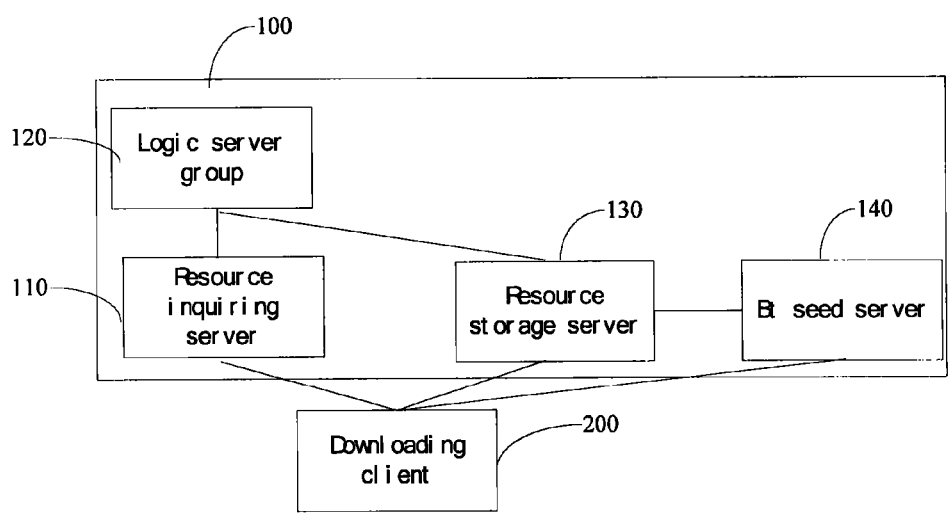
FIG. 6 is a block diagram for a data downloading system in another embodiment.

As illustrated in FIG. 6, in another embodiment, the downloading server 100 further includes a resource storage server 130 and a Bt seed server 140.

The resource storage server 130 is configured for, when the file to be downloaded is a new file, establishing and storing a mapping relationship between the URL link and the hash value of the new file, between the Bt seed information and the hash value or between the eMule downloading link information and the hash value.

Specifically, after obtaining the original downloading link, the resource inquiring server 110 determines that the file to be downloaded is a new file if the logic server group 120 cannot find the hash value of the file to be downloaded based on the original downloading link. The downloading client 200 firstly calculates the hash value of the new file, and if the original downloading link of the new file is a source URL link, the resource storage server 130 establishes and stores a bidirectional mapping relationship between the URL link and the hash value; if the original downloading link of the new file is an eMule downloading link, the resource storage server 130 establishes and stores a bidirectional mapping relationship between the eMule downloading link information and the hash value; and if the original downloading link of the new file is a Bt seed file, the resource storage server 130 establishes and stores a bidirectional mapping relationship between the Bt seed file information and the hash value.

In one embodiment, in the above newly established mapping relationship storage and index database, the data of index database may be called by the logic server group 120. When inquiring the mapping relationship, the logic server group 120 may find the mapping relationship from the index database. Meanwhile, the above newly established mapping relationship is further synchronized within the memory of the logic server group. When calling the mapping relationship, the logic server group 120 firstly performs inquiry in its memory. If it cannot be found, the group 120 then performs inquiry in the index database. Such inquiring mode may accelerate the inquiring efficiency, so as to improve the overall performance.

The Bt seed server 140 obtains and stores the Bt seed file of the file to be downloaded.

Specifically, when the file to be downloaded is a new file and the original downloading link of the new file is the Bt seed file, the Bt seed server 140 obtains the complete Bt seed file of the file to be downloaded, and stores the Bt seed file of the file to be downloaded in the Bt seed storage. In the subsequent downloading process, after obtaining the feature code of the Bt seed file, the corresponding Bt seed file can be found in the Bt seed storage. Thus, the downloading may be implemented based on the Bt seed file.

A protocol variation of the Bt downloading protocol is called Magnet protocol, i.e. "Magnet link". The main function of the Magnetic link lies in recognizing the Bt seed file. The link is a "digital fingerprint" in plain text generated by the hash result of different file contents, so as to recognize the Bt seed file of the file. The difference lies in that: this "digital fingerprint" may be generated from any file by anyone, so that the "Magnet link" does not need to be supported by any "central mechanism" (for example, the Bt Tracker server), and the recognition accuracy is very high. When the variation of the Bt downloading protocol, i.e. the Magnet protocol is adopted for downloading, the client 200 may directly recognize the Bt seed file stored in the Bt seed storage by the "digital fingerprint" in the Magnet protocol, and then perform downloading based on the Bt seed file, so that the downloading efficiency under the Magnet protocol may be improved.

In the above data downloading method and system, a downloading request containing an original downloading link of a file to be downloaded is firstly obtained, and a hash value of the file to be downloaded is obtained based on the original downloading link. Then based on the hash value of the file to be downloaded, both of Bt seed file information and eMule downloading link information of the file to be downloaded or one of the two kinds of information being different from the original downloading link are obtained, and a multi-source URL set of the file to be downloaded is obtained. Finally, the file to be downloaded is downloaded based on the multi-source URL set, the Bt seed file information and the eMule downloading link information of the file to be downloaded. According to the above method and system, the multi-source URL set, the Bt seed file information and the eMule downloading link information of the file to be downloaded may be obtained after the original downloading link of the file to be downloaded is obtained, so that the file to be downloaded may be downloaded simultaneously in respective P2P network by the downloading modes which are based on the three downloading protocols. As a result, the above method and system may sufficiently utilize the network resources and implement the data sharing based on the networks over different downloading protocols.

Figure 7:
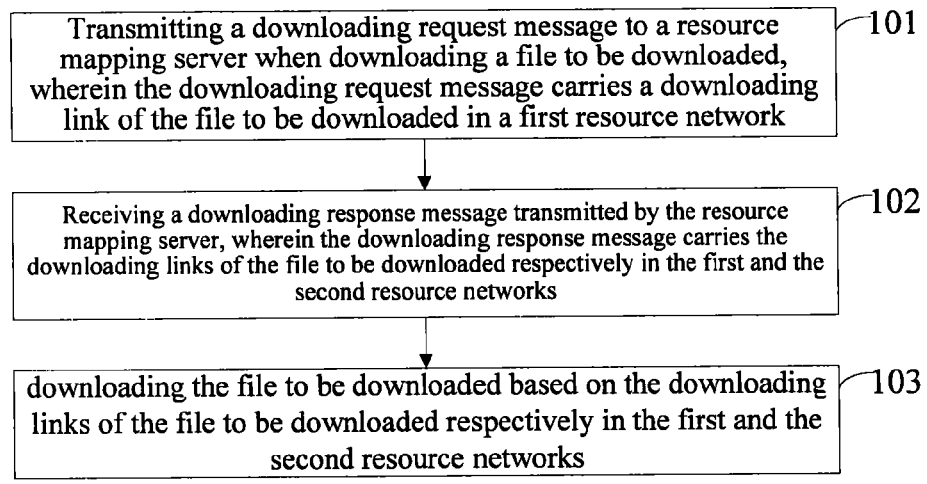
FIG. 7 is a flow diagram for a data downloading method provided by another embodiment.

As illustrated in FIG. 7, an embodiment of the present invention provides a data downloading method, including:

step 101: transmitting a downloading request message to a resource mapping server when downloading a file to be downloaded, wherein the downloading request message carries a downloading link of the file to be downloaded in a first resource network;

step 102: receiving a downloading response message transmitted by the resource mapping server, wherein the downloading response message carries the downloading links of the file to be downloaded in the first resource network and a second resource network respectively, wherein the second resource network is one or more kinds of resource networks which are different from the first resource network; and step 103: downloading the file to be downloaded based on the downloading links of the file to be downloaded in the first and the second resource networks respectively.

In this embodiment, the implementing subject may be a terminal; the file to be downloaded is a resource to be downloaded; and the downloading link is resource location information.

In the embodiment of the present invention, when downloading the file to be downloaded, the terminal obtains the downloading links of the file to be downloaded respectively in the first and the second resource networks, wherein the second resource network is one or more kinds of resource networks which are different from the first resource network; downloads the file to be downloaded based on the downloading links of the file to be downloaded respectively in the first and the second resource networks; thus, the terminal may download the resource from different resource networks, so that the resource peers in respective resource networks may be reasonably utilized, the network resources may be sufficiently used, and the data sharing based on the networks over different downloading protocols is implemented.

Figure 8:
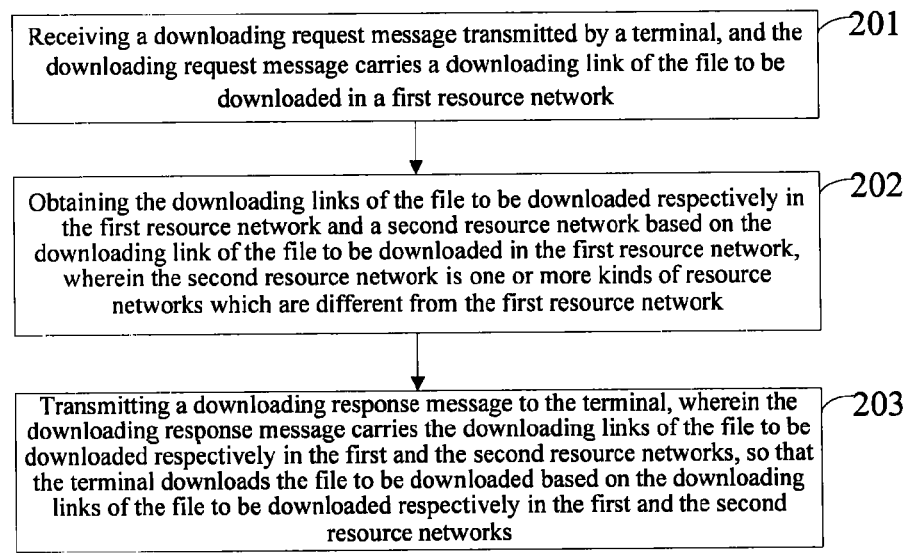
FIG. 8 is a flow diagram for a data downloading method provided by another embodiment.

As illustrated in FIG. 8, an embodiment of the present invention provides a data downloading method, including:

step 201: receiving a downloading request message transmitted by a terminal, wherein the downloading request message carries a downloading link of the file to be downloaded in a first resource network;

step 202: obtaining the downloading links of the file to be downloaded in the first resource network and a second resource network respectively based on the downloading link of the file to be downloaded in the first resource network, wherein the second resource network is one or more kinds of resource networks which are different from the first resource network;

step 203: transmitting a downloading response message to the terminal, wherein the downloading response message carries the downloading links of the file to be downloaded in the first resource network and the second resource network respectively, so that the terminal downloads the file to be downloaded based on the downloading links of the file to be downloaded in the first and the second resource networks respectively.

In this embodiment, the implementing subject may be a resource mapping server.

In the embodiment of the present invention, the resource mapping server receives a downloading request message, obtains the downloading links of the file to be downloaded respectively in the first resource network and the second resource network based on the downloading link of the file to be downloaded in the first resource network carried by the downloading request message, transmits the downloading response message to the terminal, wherein the downloading response message carries the downloading links of the file to be downloaded respectively in the first resource network and the second resource network, so that the terminal downloads the file to be downloaded based on the downloading links of the file to be downloaded respectively in the first and the second resource networks. Thus, the terminal may download resources from different resource networks, so that the resource peers in the respective resource networks may be reasonably utilized, the network resources may be sufficiently used, and the data sharing based on the networks over different downloading protocols is implemented.

Figure 9:
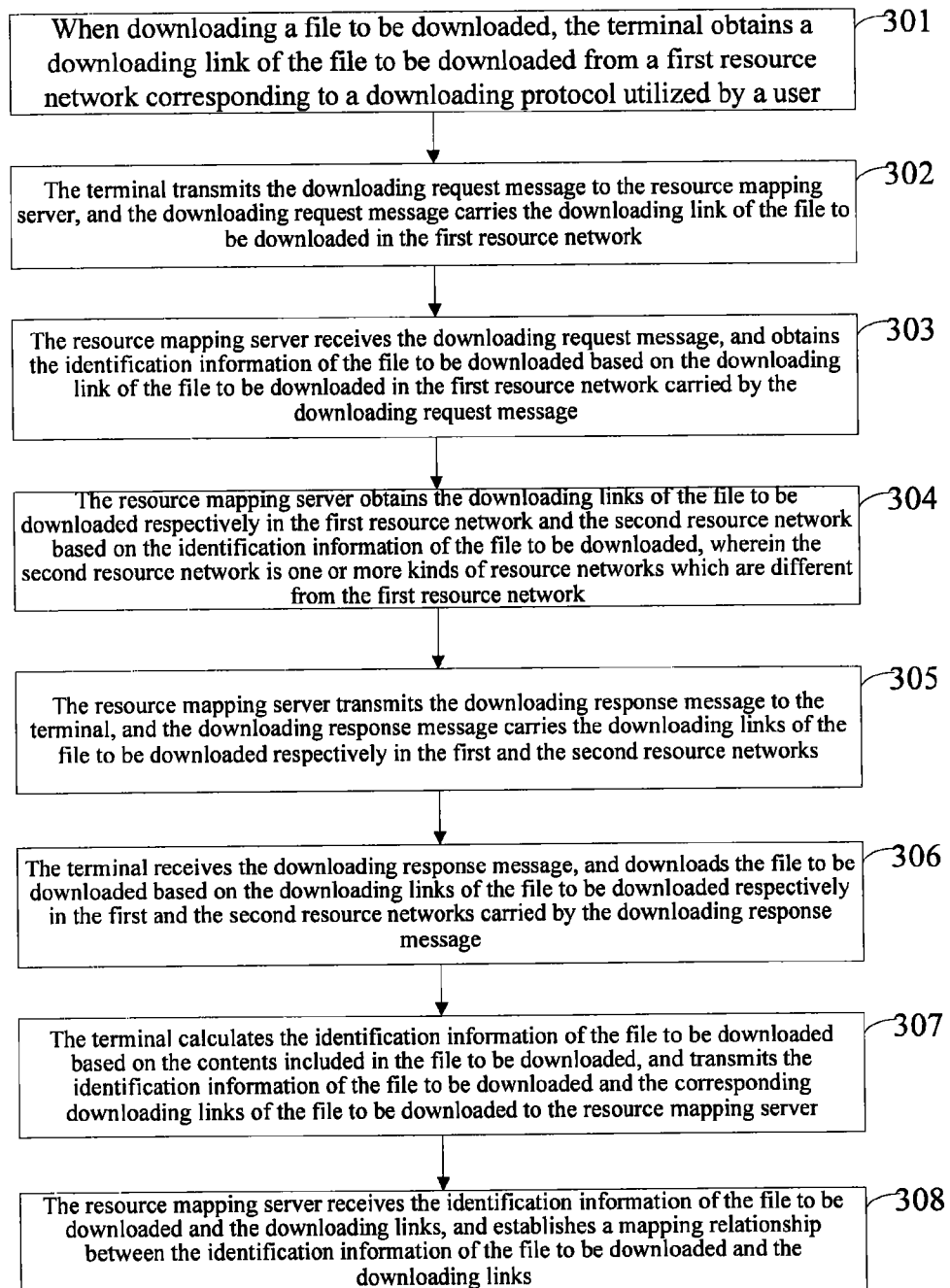
FIG. 9 is a flow diagram for a data downloading method provided by another embodiment.

As illustrated in FIG. 9, an embodiment of the present invention provides a data downloading method including the following steps.

Step 301: when downloading a file to be downloaded, a terminal obtains a downloading link of the file to be downloaded from a first resource network corresponding to a downloading protocol utilized by a user.

There might exist one or more downloading links corresponding to the file to be downloaded in the resource network corresponding to each downloading protocol; in the resource networks corresponding to different downloading protocols, the downloading links of the file to be downloaded are different from each other; for example, there might exist one or more downloading links corresponding to the file to be downloaded in the resource network corresponding to Http protocol, and the downloading link of the file to be downloaded is the URL of the file to be downloaded; there might exist one or more downloading links corresponding to the file to be downloaded in the resource network corresponding to Bt protocol, and the downloading link of the file to be downloaded is the hash information of the file to be downloaded; and there might exist one or more downloading links corresponding to the file to be downloaded in the resource network corresponding to eD2k (eDonkey2000 network) protocol, and the downloading link of the file to be downloaded is the eD2k hash value of the file to be downloaded.

The user downloads the file to be downloaded in the terminal by utilizing one downloading protocol, and the terminal obtains the downloading link of the file to be downloaded from the first resource network corresponding to the downloading protocol utilized by the user. If the downloading protocol utilized by the user in the terminal is Http protocol, the downloading link of the file to be downloaded which the terminal may receive from the user's input is the URL of the file to be downloaded; if the downloading protocol utilized by the user in the terminal is BT protocol, the terminal obtains the seed file of the file to be downloaded, wherein the seed file includes information such as the hash information, the validation information, the address of the peer index server and the like of the file to be downloaded, and then the terminal obtains the hash information of the file to be downloaded as the downloading link of the file to be downloaded; if the downloading protocol utilized by the user in the terminal is eD2k protocol, the terminal firstly obtains the eD2k link information of the file to be downloaded, wherein the eD2k link information includes information such as the eD2k hash value, the file name, the address of the peer index server and the like of the file to be downloaded, and the eD2k hash value of the file to be downloaded is obtained from the eD2k link information as the downloading link of the file to be downloaded.

For example, it is assumed that in this embodiment, the downloading protocol utilized by the user in the terminal is Http protocol, and the downloading link of the file to be downloaded obtained by the terminal is URL1.

Step 302: the terminal transmits a downloading request message to a resource mapping server, and the downloading request message carries the downloading link of the file to be downloaded in the first resource network.

For example, the terminal transmits the downloading request message to the resource mapping server, and the downloading request message carries the URL1 as the downloading link of the file to be downloaded in the first resource network.

Step 303: the resource mapping server receives the downloading request message, and obtains identification information of the file to be downloaded based on the downloading link of the file to be downloaded in the first resource network carried by the downloading request message.

Specifically, the resource mapping server receives the downloading request message, inquires a mapping relationship between the identification information and the downloading link of the file to be downloaded stored by the resource mapping server based on the downloading link of the file to be downloaded in the first resource network carried by the downloading request message so as to find the corresponding identification information, and the identification information being inquired is the identification information of the file to be downloaded.

The mapping relationship between the identification information and the downloading link is stored in the resource mapping server in advance; one file only corresponds to one piece of identification information, while each file corresponds to one or more downloading links in different resource networks. Thus, the identification information of one file corresponds to one or more downloading links.

When publishing a file, the resource publisher may calculate identification information of the file based on the contents included in the file, and then establish the mapping relationship between the identification information of the file and the downloading link of the file in the resource mapping server.

It should be noted that identification information of a file is obtained by the calculation based on the contents in the file, and thus the file merely corresponds to one piece of identification information.

For example, in this embodiment, it is assumed that there is a mapping relationship between the identification information and the downloading link as illustrated in table 1 in the resource mapping server. For a certain file, the file corresponds to a piece of identification information ID1, and the downloading link of the file in the resource network corresponding to Http protocol is URL1, the downloading link of the file in the resource network corresponding to Bt protocol is hash information Info_hash1, and the downloading link of the file in the resource network corresponding to eD2k protocol is eD2k hash value eD2k-hash1.

TABLE 1

| Identification information | Downloading link |
|---|---|
| ID1 | URL1 |
| ID1 | Info_hash1 |
| ID1 | eD2k-hash1 |
| ... | ... |

For example, the resource mapping server receives the downloading request information, inquires the mapping relationship between the identification information and the downloading link as illustrated in table 1 based on the downloading link URL1 of the file to be downloaded in the first resource network carried by the downloading request message, and finds the corresponding identification information ID1. Thus the identification information ID1 of the file to be downloaded is obtained.

Step 304: the resource mapping server obtains the downloading link of the file to be downloaded respectively in the first resource network and a second resource network based on the identification information of the file to be downloaded, wherein the second resource network is one or more kinds of resource networks which are different from the first resource network.

Specifically, the resource mapping server finds the downloading links of the file to be downloaded in the first and the second resource networks from the mapping relationship between the identification information and the downloading link which is stored by the resource mapping server based on the identification information of the file to be downloaded.

For example, the resource mapping server inquires the mapping relationship between the identification information and the downloading link as illustrated in FIG. 1 based on the identification information ID1 of the file to be downloaded, and finds that the downloading link of the file to be downloaded in the resource network corresponding to Http protocol is URL1, the downloading link of the file to be downloaded in the resource network corresponding to Bt protocol is Info_hash1, and the downloading link of the file to be downloaded in the resource network corresponding to eD2k protocol is eD2k-hash1. Thus, the downloading links URL1, Info_hash1 and eD2k-hash1 of the file to be downloaded respectively in the first and the second resource networks are obtained.

Step 305: the resource mapping server transmits a downloading response message to the terminal, and the downloading response message carries the downloading links of the file to be downloaded respectively in the first and the second resource networks.

For example, the resource mapping server transmits the downloading response message to the terminal, and the downloading response message carries the downloading link URL 1 of the file to be downloaded in the resource network corresponding to Http protocol, the downloading link Info_hash1 of the file to be downloaded in the resource network corresponding to Bt protocol, and the downloading link eD2k-hash1 of the file to be downloaded in the resource network corresponding to eD2k protocol.

Step 306: the terminal receives the downloading response message, and downloads the file to be downloaded based on the downloading links of the file to be downloaded respectively in the first and the second resource networks carried by the downloading response message.

For example, the terminal receives the downloading response message, and the downloading response message carries the downloading link URL1 of the file to be downloaded in the resource network corresponding to Http protocol, the downloading link Info_hash1 of the file to be downloaded in the resource network corresponding to Bt protocol, and the downloading link eD2k-hash1 of the file to be downloaded in the resource network corresponding to eD2k protocol; the file to be downloaded is divided into three portions, i.e. a first portion, a second portion and a third portion. Then the first portion of the file to be downloaded is downloaded based on the downloading link URL1 of the file to be downloaded in the resource network corresponding to Http protocol, the second portion of the file to be downloaded is downloaded based on the downloading link Info_hash1 of the file to be downloaded in the resource network corresponding to Bt protocol, and the third portion of the file to be downloaded is downloaded based on the downloading link eD2k-hash1 of the file to be downloaded in the resource network corresponding to eD2k protocol; and the file to be downloaded is constituted by the downloaded first portion, second portion and third portion.

It should be noted that: during the process of downloading the file to be downloaded based on the corresponding downloading links of the file to be downloaded in one or more kinds of resource networks, it is possible to obtain a new downloading link, and the terminal may download the file to be downloaded based on the corresponding downloading links of the file to be downloaded in one or more kinds of resource networks and the obtained new downloading link. For example, it is assumed that during the process of downloading the first portion of the file to be downloaded by the terminal based on the downloading link URL1 of the file to be downloaded in the resource network corresponding to Http protocol, a new downloading link URL 2 is obtained, then the terminal may download the first portion of the file to be downloaded based on the downloading link URL1 of the file to be downloaded in the resource network corresponding to Http protocol and the obtained new downloading link URL2.

Step 307: the terminal calculates identification information of the file to be downloaded based on the contents included in the file to be downloaded, and transmits the identification information of the file to be downloaded and the corresponding downloading link of the file to be downloaded to the resource mapping server.

The terminal may calculate and obtain the identification information of the file to be downloaded by MD5 (Message Digest Algorithm, MD5) based on the contents included in the file to be downloaded. The identification information of each file is obtained by calculation based on the contents included in each file, and thus each file merely corresponds to one piece of identification information.

For example, after downloading the file to be downloaded, the terminal calculates and infers that the identification information of the file to be downloaded is ID1 by the MD5 algorithm based on the contents included in the file to be downloaded, and then transmits the identification information ID1 of the file to be downloaded and the downloading links URL1, URL2, Info_hash1 and eD2k-hash1 of the file to be downloaded.

Step 308: the resource mapping server receives the identification information of the file to be downloaded and the downloading links, and establishes a mapping relationship between the identification information of the file to be downloaded and the downloading links.

Specifically, the resource mapping server receives the identification information of the file to be downloaded and the downloading links, and inquires the stored mapping relationship between the identification information and the downloading links based on the identification information of the file to be downloaded; if a corresponding downloading link is found, then the server removes the downloading link being found from the downloading links to be downloaded, and stores a mapping relationship between the identification information of the file to be downloaded and the remaining downloading links; if a corresponding downloading link is not found, then the server stores a mapping relationship between the identification information of the file to be downloaded and the downloading links.

For example, the resource mapping server receives the identification information ID1 of the file to be downloaded and the downloading links URL1, URL2, Info_hash1 and eD2k-hash1 of the file to be downloaded transmitted by the terminal, inquires the mapping relationship between the identification information and the downloading links as illustrated in table 1 based on the identification information ID1 of the file to be downloaded, and finds the corresponding downloading links URL1, Info_hash1 and eD2k-hash1, removes the downloading links URL1, Info_hash1 and eD2k-hash1 being found from the downloading links URL1, URL2, Info_hash1 and eD2k-hash1 of the file to be downloaded, stores a mapping relationship between the identification information ID1 of the file to be downloaded and the remaining downloading link URL2, and obtains the mapping relationship between the identification information and the downloading links as illustrated in table 2.

TABLE 2

| Identification information | Downloading link |
| --- | --- |
| ID1 | URL1 |
| ID1 | Info_hash1 |
| ID1 | eD2k-hash1 |
| ID1 | URL2 |
| ... | ... |

Furthermore, the resource mapping server may further include a mapping relationship between the downloading links and the downloading time. Accordingly, after receiving the downloading links of the file to be downloaded transmitted by the terminal, the resource mapping server obtains the downloading time of the file to be downloaded, and establishes a mapping relationship between the downloading links of the file to be downloaded and the obtained downloading time.

Specifically, the resource mapping server obtains a current time, and adopts the current time as the downloading time for downloading the file to be downloaded, and inquires the stored mapping relationship between the downloading links and the downloading time based on the downloading link of the file to be downloaded; if a corresponding downloading time is found, then the server updates the downloading time being found to the downloading time for downloading the file to be downloaded; and if a corresponding downloading time is not found, then the server stores a mapping relationship between the downloading links of the file to be downloaded and the downloading time for downloading the file to be downloaded.

Furthermore, the resource mapping server monitors the mapping relationship between the downloading links and the downloading time; if the server finds a downloading link with downloading time being ahead of a preset time by monitoring, then the server deletes the mapping relationship including the downloading link with the downloading time being ahead of the preset time from the mapping relationship between the identification information and the downloading links; furthermore, the resource mapping server may also delete the mapping relationship including the downloading link with the downloading time being ahead of the preset time from the mapping relationship between the downloading links and the downloading time.

Specifically, the resource mapping server periodically scans each piece of information in the mapping relationship between the downloading links and the downloading time, and calculates the time difference between the current time and the downloading time included in the mapping relationship being scanned; if the calculated time difference exceeds the a predetermined time period, then the server finds that the downloading link included in the mapping relationship being scanned is the downloading link with the downloading time being ahead of the preset time, and then deletes the mapping relationship being scanned from the mapping relationship between the downloading links and the downloading time, and the server locates the mapping relationship including the downloading link with the downloading time being ahead of the preset time in the mapping relationship between the identification information and the downloading links, and deletes the mapping relationship being located; however, if the calculated time difference does not exceed the predetermined time period, then the server finds that the downloading link included in the mapping relationship being scanned is the downloading link with the downloading time being within the preset time.

In the embodiment of the present invention, the resource mapping server receives the downloading request message transmitted by the terminal, obtains the downloading links of the file to be downloaded respectively in the first and the second resource networks based on the downloading link of the file to be downloaded in the first resource network carried by the downloading request message, transmits the downloading response message to the terminal, wherein the downloading response message carries the downloading links of the file to be downloaded respectively in the first and second resource networks, and the terminal downloads the file to be downloaded based on the downloading links of the file to be downloaded respectively in the first and the second resource networks. Thus, the terminal may download the resource from different resource networks, so that the resource peers in respective resource networks may be reasonably utilized, the network resources may be sufficiently used, and the data sharing based on the different downloading protocol based networks is implemented.

Figure 10:
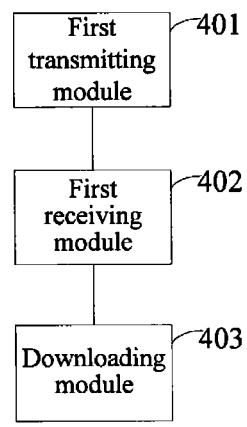
FIG. 10 is a structure diagram for a terminal provided by an embodiment.

As illustrated in FIG. 10, an embodiment of the present invention provides a terminal, including:

a first transmitting module 401, being configured for transmitting a downloading request message to a resource mapping server when downloading a file to be downloaded, wherein the downloading request message carries a downloading link of the file to be downloaded in a first resource network;

a first receiving module 402, being configured for receiving a downloading response message transmitted by the resource mapping server, wherein the downloading response message carries the downloading links of the file to be downloaded respectively in the first resource network and a second resource network, wherein the second resource network is one or more kinds of resource networks which are different from the first resource network;

a downloading module 403, being configured for downloading the file to be downloaded based on the downloading links of the file to be downloaded respectively in the first and the second resource networks.

Furthermore, the terminal further includes:

a first acquiring module, being configured for obtaining the downloading link of the file to be downloaded in the first resource network.

Furthermore, the terminal further includes:

a calculating module, being configured for calculating the identification information of the file to be downloaded based on the contents included in the file to be downloaded, and transmitting the identification information of the file to be downloaded and the downloading links to the resource mapping server.

In the embodiment of the present invention, when downloading the file to be downloaded, the terminal obtains the downloading links of the file to be downloaded respectively in the first and the second resource networks, downloads the file to be downloaded based on the downloading links of the file to be downloaded respectively in the first and the second resource networks; thus, the terminal may download the resource from different resource networks, so that the resource peers in respective resource networks may be reasonably utilized, the network resources may be sufficiently used, and the data sharing based on the networks over different downloading protocols is implemented.

Figure 11:
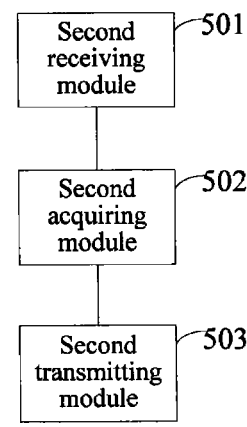
FIG. 11 is a structure diagram for a resource mapping server provided by an embodiment.

As illustrated in FIG. 11, an embodiment of the present invention provides a resource mapping server, including:

a second receiving module 501, being configured for receiving a downloading request message transmitted by a terminal, wherein the downloading request message carries a downloading link of a file to be downloaded in a first resource network;

a second acquiring module 502, being configured for obtaining the downloading links of the file to be downloaded respectively in the first resource network and a second resource network based on the downloading link of the file to be downloaded in the first resource network, wherein the second resource network is one or more kinds of resource networks which are different from the first resource network;

a second transmitting module 503, being configured for transmitting a downloading response message to the terminal, wherein the downloading response message carries the downloading links of the file to be downloaded respectively in the first resource network and a second resource network, so that the terminal downloads the file to be downloaded based on the downloading links of the file to be downloaded respectively in the first and the second resource networks.

The second acquiring module 502 includes:

a first inquiring module, being configured for obtaining the identification information of the file to be downloaded from a stored mapping relationship between the identification information and the downloading links based on the downloading link of the file to be downloaded in the first resource network.

a second inquiring module, being configured for obtaining the downloading links of the file to be downloaded respectively in the first and the second resource networks from the stored mapping relationship between the identification information and the downloading links based on the identification information of the file to be downloaded.

Furthermore, the server further includes:

a first establishing module, being configured for receiving the identification information of the file to be downloaded and the downloading links transmitted by the client, and establishing a mapping relationship between the identification information of the file to be downloaded and the downloading links after the downloading of the file to be downloaded is completed by the terminal.

Furthermore, the server further includes:

a second establishing module, being configured for obtaining the downloading time for downloading the file to be downloaded, and establishing a mapping relationship between the downloading links of the file to be downloaded and the downloading time.

Furthermore, the server further includes:

a first deleting module, being configured for monitoring the stored mapping relationship between the downloading links and the downloading time, and if the downloading link with the downloading time being ahead of a preset time is found by monitoring, deleting the mapping relationship including the downloading link with the downloading time being ahead of the preset time from the stored mapping relationship between the identification information and the downloading links.

Furthermore, the server further includes:

a second deleting module, being configured for, if the downloading link with the downloading time being ahead of a preset time is found by monitoring, deleting the mapping relationship including the downloading link with the downloading time being ahead of the preset time from the stored mapping relationship between the downloading links and the downloading time.

In the embodiment of the present invention, the resource mapping server receives a downloading request message, obtains the downloading links of the file to be downloaded respectively in the first resource network and the second resource network based on the downloading link of the file to be downloaded in the first resource network carried by the downloading request message, transmits a downloading response message to the terminal, wherein the downloading response message carries the downloading links of the file to be downloaded respectively in the first resource network and the second resource network, so that the terminal downloads the file to be downloaded based on the downloading links of the file to be downloaded respectively in the first and the second resource networks. Thus, the terminal may download resources from different resource networks, so that the resource peers in respective resource networks may be rational utilized, the network resources may be sufficiently used, and the data sharing based on the networks by different downloading protocols is implemented.

Figure 12:
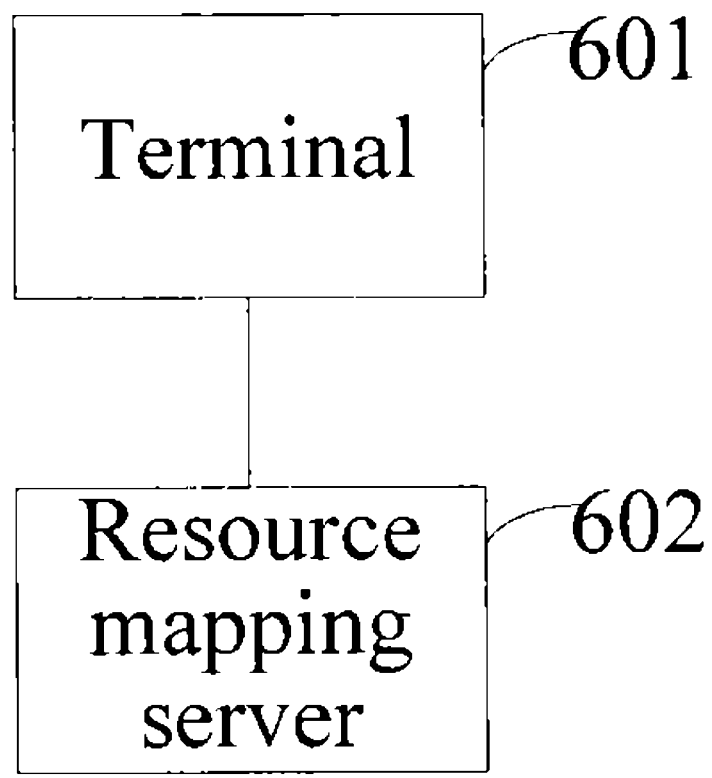
FIG. 12 is a system structure diagram for downloading resources provided by an embodiment.

As illustrated in FIG. 12, an embodiment of the present invention provides a resource downloading system, including:

a terminal 601 as illustrated in FIG. 10 and a resource mapping server 602 as illustrated in FIG. 11.

In the embodiment of the present invention, the resource mapping server receives the downloading request message transmitted by the terminal, obtains the downloading links of the file to be downloaded respectively in the first and the second resource networks based on the downloading link of the file to be downloaded in the first resource network carried by the downloading request message, transmits the downloading response message to the terminal, wherein the downloading response message carries the downloading links of the file to be downloaded respectively in the first and the second resource networks, and the terminal downloads the file to be downloaded based on the downloading links of the file to be downloaded respectively in the first and the second resource networks. Thus, the terminal may download the resource from different resource networks, so that the resource peers in respective resource networks may be rational utilized, the network resources may be sufficiently used, and the data sharing based on the networks by different downloading protocols is implemented.

The above embodiments merely illustspeed several implementation modes of the present invention, and the descriptions thereof are comparatively specific and in details. It should be noted that many modifications and improvements are obvious for those skilled in the art without departing from the principle of the present invention, which also fall into the protection scope of the present invention. Thus, the protect scope of the present invention is defined by the appended claims.

Those skilled in the art may understand that all or part of the steps of the above embodiments may be implemented by hardware, or may be implemented by program instructing the associated hardware, and the program may be stored in a computer readable storage medium. The above storage medium may be a read only memory, a magnetic disk, a compact disk, or etc.

The above recitations are merely preferred embodiment of the present invention, and are not used for limiting the present invention. Any modification, equivalent substitution, improvement, and etc made under the spirit and principle of the present invention should fall into the protection scope of the present invention.

What is claimed is:

1. A data downloading method, wherein the method includes the steps of:

obtaining a downloading request for a file to be downloaded, wherein the downloading request includes an original downloading link, which is any one of a source URL link, a bit stream (BT) seed file, and an eMule downloading link;

obtaining a hash value of the file to be downloaded based on the original downloading link;

based on the hash value of the file to be downloaded, if the original downloading link is the BT seed file, obtaining the eMule downloading link information of the file to be downloaded and a multi-source URL set; if the original downloading link is the eMule downloading link, obtaining the Bt seed file information of the file to be downloaded and the multi-source URL set; and if the original downloading link is the source URL link, obtaining the Bt seed file information and the eMule downloading link information of the file to be downloaded and the multi-source URL set;

downloading the file to be downloaded based on the obtained Bt seed file information and/or eMule downloading link information of the file to be downloaded, and the multi-source URL set, wherein the Bt seed file information is a feature code and a file number of the Bt seed file, the eMule downloading link information is an information abstract value and a file size of the file to be downloaded, and the step of downloading the file to be downloaded based on the obtained Bt seed file information and/or eMule downloading link information of the file to be downloaded, and the multi-source URL set comprises:

dividing the file to be downloaded into a plurality of segments, and scheduling downloading tasks for the segments based on downloading capabilities;

downloading the segments based on the multi-source URL set of the file to be downloaded;

if the original downloading link is a Bt seed file, downloading the segments based on the original downloading link, and if otherwise, obtaining the Bt seed based on the feature code of the Bt seed file of the file to be downloaded, and downloading the segments based on the Bt seed;

if the original downloading link is an eMule downloading link, downloading the segments based on the original downloading link, and if otherwise, constituting an eMule downloading link based on the information abstract value and the file size of the file to be downloaded, and downloading the segments based on the eMule downloading link.

2. The data downloading method according to claim 1, wherein the method further includes:

if the file to be downloaded is a new file, establishing and storing a mapping relationship between the URL link and the hash value, between the Bt seed information and the hash value, or between the eMule downloading link information and the hash value of the new file.

3. The data downloading method according to claim 2, wherein the method further includes:

if the file to be downloaded is the new file, obtaining and storing the Bt seed file of the file to be downloaded.

4. A data downloading system, including a downloading server and a downloading client, wherein the downloading server includes:
- a resource inquiring server, being configured for obtaining a downloading request for a file to be downloaded, the downloading request includes an original downloading link, and the original downloading link is anyone of a source URL link, a bit stream (BT) seed file, and an eMule downloading link;
- a logic server group, being configured for obtaining a hash value of the file to be downloaded based on the original downloading link;
- the logic server group is further configured for: based on the hash value of the file to be downloaded, if the original downloading link is the BT seed file, obtaining the eMule downloading link information of the file to be downloaded and a multi-source URL set; if the original downloading link is the eMule downloading link, obtaining the Bt seed file information of the file to be downloaded and the multi-source URL set; and if the original downloading link is the source URL link, obtaining the Bt seed file information and the eMule downloading link information of the file to be downloaded and the multi-source URL set;
- the downloading client is configured for downloading the file to be downloaded based on the obtained Bt seed file information and/or eMule downloading link information of the file to be downloaded, and the multi-source URL set,
- wherein the Bt seed file information is a feature code and a file number of the Bt seed file, the eMule downloading link information is an information abstract value and a file size of the file to be downloaded, and the downloading client includes:
  - a scheduling module, being configured for dividing the file to be downloaded into a plurality of segments, and scheduling downloading tasks for the segments based on downloading capabilities;
  - a downloading module, including:
    - a Http downloading unit, being configured for downloading the segments based on the multi-source URL set of the file to be downloaded;
    - a Bt downloading unit, being configured for, if the original downloading link is a Bt seed file, downloading the segments based on the original downloading link, and if otherwise, obtaining the Bt seed based on the feature code of the Bt seed file of the file to be downloaded, and downloading the segments based on the Bt seed;
    - an eMule downloading unit, being configured for, if the original downloading link is an eMule downloading link, downloading the segments based on the original downloading link, and if otherwise, constituting an eMule downloading link based on the information abstract value and the file size of the file to be downloaded, and downloading the segments based on the eMule downloading link.

5. The data downloading system according to claim 4, wherein the downloading server further includes a resource storage module, and the resource storage module is configured for, if the file to be downloaded is a new file, establishing and storing a mapping relationship between the URL link and the hash value, between the Bt seed information and the hash value, or between the eMule downloading link information and the hash value of the new file.

6. The data downloading system according to claim 5, wherein the downloading server further includes a Bt seed server, and the Bt seed server is configured for, if the file to be downloaded is a new file, obtaining and storing the Bt seed file of the file to be downloaded.

7. A data downloading method, wherein the method includes the following steps:
- receiving a downloading request message transmitted by a terminal, wherein the downloading request message carries a downloading link of the file to be downloaded in a first resource network;
- obtaining the downloading links of the file to be downloaded respectively in a first and a second resource networks based on the downloading link of the file to be downloaded in the first resource network, wherein the second resource network is one or more kinds of resource networks which are different from the first resource network;
- transmitting a downloading response message to the terminal, wherein the downloading response message carries the downloading links of the file to be downloaded respectively in the first and the second resource networks, so that the terminal downloads the file to be downloaded based on the downloading links of the file to be downloaded respectively in the first and the second resource networks; and
- monitoring the stored mapping relationship between the downloading links and the downloading time, if the downloading link with the downloading time being ahead of a preset time is found by monitoring, deleting the mapping relationship including the downloading link with the downloading time being ahead of the preset time from the stored mapping relationship between the identification information and the downloading links.

8. The data downloading method according to claim 7, wherein the step of obtaining the corresponding downloading links of the file to be downloaded respectively in the first and the second resource networks based on the downloading link of the file to be downloaded in the first resource network comprises:
- obtaining the identification information of the file to be downloaded from a stored mapping relationship between the identification information and the downloading links based on the downloading link of the file to be downloaded in the first resource network;
- obtaining the downloading links of the file to be downloaded respectively in the first and the second resource networks from the stored mapping relationship between the identification information and the downloading links based on the identification information of the file to be downloaded.

9. The data downloading method according to claim 7, wherein the method further includes:
- receiving the identification information of the file to be downloaded and the downloading links transmitted by the client, and establishing a mapping relationship between the identification information of the file to be downloaded and the downloading links after the downloading of the file to be downloaded is completed by the terminal.

10. The data downloading method according to claim 9, further including,
- after receiving the identification information of the file to be downloaded and the downloading links transmitted by the client: obtaining downloading time for downloading the file to be downloaded, and establishing a mapping relationship between the downloading links of the file to be downloaded and the downloading time.

11. The data downloading method according to claim 7, wherein the method further includes:

if the downloading link with the downloading time being ahead of the preset time is found by monitoring, deleting the mapping relationship including the downloading link with the downloading time being ahead of the preset time from the stored mapping relationship between the downloading links and the downloading time.

12. A resource mapping server, wherein the server includes:

a second receiving module, being configured for receiving a downloading request message transmitted by a terminal, wherein the downloading request message carries a downloading link of the file to be downloaded in a first resource network;

a second acquiring module, being configured for obtaining the downloading links of the file to be downloaded respectively in the first resource network and a second resource network based on the downloading link of the file to be downloaded in the first resource network, wherein the second resource network is one or more kinds of resource networks which are different from the first resource network;

a second transmitting module, being configured for transmitting a downloading response message to the terminal, wherein the downloading response message carries the downloading links of the file to be downloaded respectively in the first and the second resource networks, so that the terminal downloads the file to be downloaded based on the downloading links of the file to be downloaded respectively in the first and the second resource networks; and a first deleting module, being configured for monitoring the stored mapping relationship between the downloading link and the downloading time, if the downloading link with the downloading time being ahead of a preset time is found by monitoring, deleting the mapping relationship including the downloading link with the downloading time being ahead of the preset time from the stored mapping relationship between the identification information and the downloading link.

13. The server according to claim 12, wherein the second acquiring module includes:

a first inquiring module, being configured for obtaining identification information of the file to be downloaded from a stored mapping relationship between the identification information and the downloading links based on the downloading link of the file to be downloaded in the first resource network;

a second inquiring module, being configured for obtaining the downloading links of the file to be downloaded respectively in the first and the second resource networks from the stored mapping relationship between the identification information and the downloading links based on the identification information of the file to be downloaded.

14. The server according to claim 12, wherein the server further includes:

a first establishing module, being configured for receiving the identification information of the file to be downloaded and the downloading links transmitted by the terminal, and establishing-a mapping relationship between the identification information of the file to be downloaded and the downloading links after the downloading of the file to be downloaded is completed by the terminal.

15. The server according to claim 14, wherein the server further includes:

a second establishing module, being configured for obtaining downloading time for downloading the file to be downloaded, and establishing a mapping relationship between the downloading links of the file to be downloaded and the downloading time.

16. The server according to claim 12, wherein the server further includes:

a second deleting module, being configured for, if the downloading link with the downloading time being ahead of a preset time is found by monitoring, deleting the mapping relationship including the downloading link with the downloading time being ahead of the preset time from the stored mapping relationship between the downloading link and the downloading time.

* * * * *